United States Patent
Sanada et al.

(10) Patent No.: US 9,333,783 B1
(45) Date of Patent: May 10, 2016

(54) PRINTER APPARATUS

(71) Applicant: TOSHIBA TEC KABUSHIKI KAISHA, Shinagawa-ku, Tokyo (JP)

(72) Inventors: Tsuyoshi Sanada, Shizuoka (SG); Kenji Eoka, Singapore (SG); Akira Oda, Sinapore (SG)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/797,434

(22) Filed: Jul. 13, 2015

(51) Int. Cl.
*B41J 2/00* (2006.01)
*B41J 29/38* (2006.01)
*B41J 2/325* (2006.01)
*G06K 15/02* (2006.01)
*B41J 2/36* (2006.01)

(52) U.S. Cl.
CPC *B41J 29/38* (2013.01); *B41J 2/325* (2013.01); *G06K 15/028* (2013.01); *B41J 2/36* (2013.01)

(58) Field of Classification Search
None
See application file for complete search history.

(56) References Cited

U.S. PATENT DOCUMENTS

| | | | | |
|---|---|---|---|---|
| 4,619,537 A | * | 10/1986 | Do | B41J 33/36 400/225 |
| 2013/0076821 A1 | * | 3/2013 | Yamauchi | B41J 19/202 347/14 |
| 2013/0107317 A1 | * | 5/2013 | Yamauchi | B41J 13/106 358/1.15 |

FOREIGN PATENT DOCUMENTS

JP       2003-136775       5/2003

* cited by examiner

*Primary Examiner* — Lisa M Solomon
(74) *Attorney, Agent, or Firm* — Amin, Turocy & Watson LLP; Gregory Turocy (57) ABSTRACT

A printer apparatus comprises a paper conveyance path on which a paper is conveyed; a carrier which moves in a direction orthogonal to conveyance direction of the paper conveyed on the paper conveyance path; a dot matrix print head which includes head pins arranged in the carrier; an ink ribbon cassette which stores an ink ribbon; a photo sensor which is arranged at the external side of the movement direction of the carrier in the printing area of paper and at the downstream side in the paper conveyance direction of the dot matrix print head; a concentration detection pattern printing module which prints a predetermined concentration detection pattern with the head pins; and an exchange necessity determination section which determines whether to exchange the ink ribbon cassette according to the value obtained by detecting the printing created by the concentration detection pattern printing module through the photo sensor.

3 Claims, 7 Drawing Sheets

PRINTER APPARATUS

FIELD

Embodiments described herein relate generally to a printer apparatus which prints on a paper and issues the printed paper.

BACKGROUND

As a method of printing arbitrary characters on a medium serving as a printing target such as a paper, a passbook and the like, an impact dot printer of a wire dot system is widely known. In such an impact dot printer, the medium serving as the printing target is arranged between a print head and a platen. An ink ribbon impregnated with ink is arranged between the print head and the printing medium, and when printing, the ink impregnated in the ink ribbon is sequentially transferred to the medium. Since the ink is sequentially transferred to the medium, if a large number of characters are printed, the amount of the impregnated ink is decreased and thus the thickness of the printed characters becomes thinner and thinner. Thus, a reflection-type photo sensor is arranged on the print head, and it is also known that when the reflection-type photo sensor detects that the ink concentration of the printed characters becomes lower than a given value, the printing operations of the printer are stopped and the user is informed of that the ink ribbon is needed to be exchanged. However, the head used to carry out printing includes head pins that are used frequently and head pins that are not used much. The amount of the ink impregnated in the ink ribbon which is contacted with the head pins that are not used much is more than the amount of the ink impregnated in the ink ribbon which is contacted with the head pins that are used frequently. As a result, if the printing for confirming whether to exchange the ink ribbon is carried out at such a position where the ink ribbon is contacted with the head pins that are not used much, it may be determined that there is no need to exchange the ink ribbon, regardless of a state in which the ink ribbon should have been exchanged.

DETAILED DESCRIPTION

In accordance with an embodiment, a printer apparatus comprises a paper conveyance path configured to convey a paper; a carrier configured to move in a direction orthogonal to a conveyance direction of the paper to be conveyed on the paper conveyance path; a dot matrix print head configured to include head pins arranged in the carrier; an ink ribbon cassette in which an ink ribbon is arranged; a photo sensor configured to be arranged at the external side of the movement direction of the carrier in the printing area of paper and at the downstream side in the paper conveyance direction of the dot matrix print head; a concentration detection pattern printing module configured to print a predetermined concentration detection pattern with the head pins; and an exchange necessity determination section configured to determine an exchange necessity of the ink ribbon cassette according to a value that is obtained by detecting the printing created by the concentration detection pattern printing module through the photo sensor.

Hereinafter, the printer apparatus according to the present embodiment is described in detail with reference to the accompanying drawings.

Figure 1:
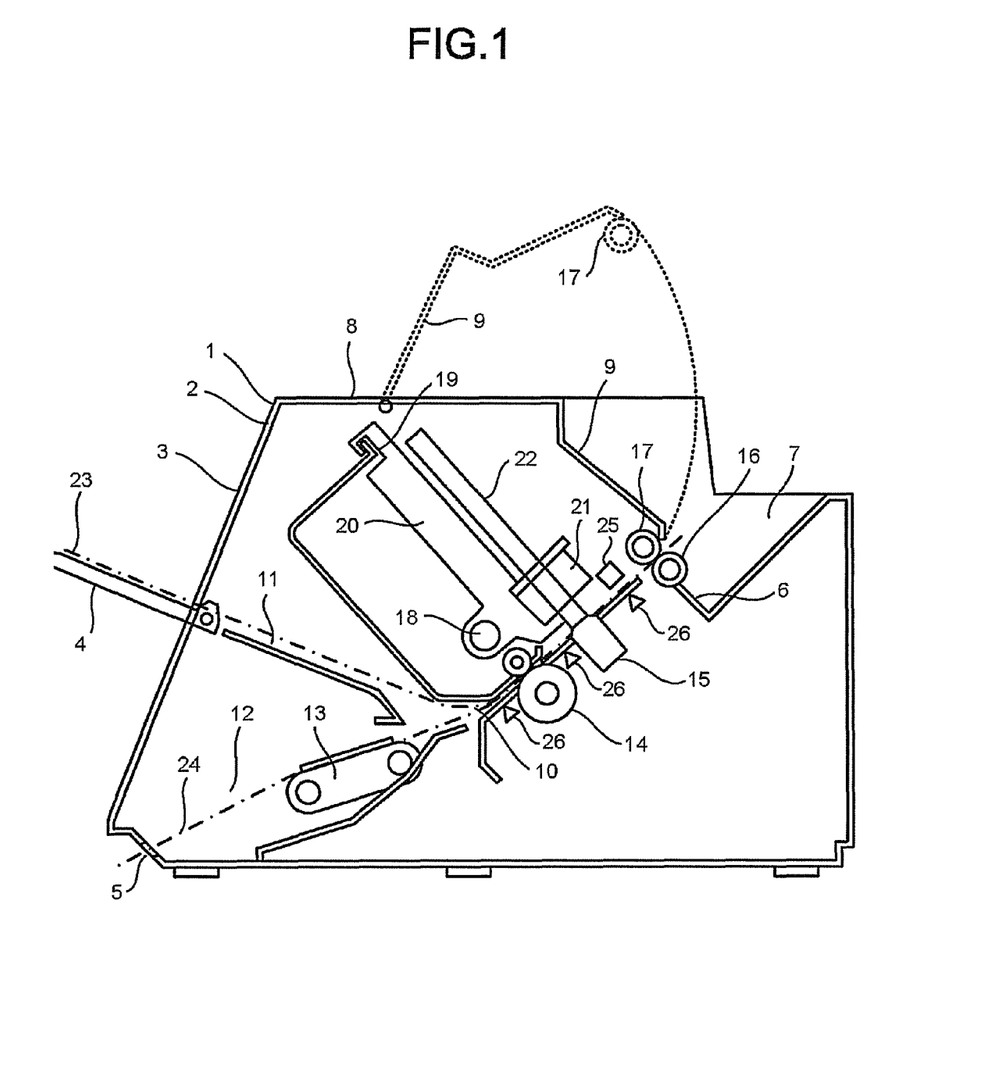
FIG. 1 is a cross-sectional side view illustrating a printer apparatus according to a first embodiment.

FIG. 1 is a cross-sectional side view illustrating the main portions of a printer apparatus 1 serving as the impact dot printer according to the present embodiment.

An opening section 3 is formed on a front surface 2 of the printer apparatus 1, and a manual feeding tray 4 is arranged at the opening section 3 in an openable manner. Further, a paper feeding port 5 is formed at the lower portion on the front surface 2 of the printer apparatus 1, and a paper discharge support 7 is arranged on a back surface 6. Further, an opening/closing cover 9 is rotatably supported on a top surface 8 of the printer apparatus 1.

A paper conveyance path 10 is arranged at the central part of the printer apparatus 1. The paper conveyance path 10 is connected with, at the upstream side thereof, a paper feed passage 11 arranged on an extended surface of the manual feeding tray 4 in an opened state and a paper feed passage 12 leading to the paper feeding port 5; and is connected with, at the downstream side thereof, the paper discharge support 7. A tractor 13 is arranged on the paper feed passage 12, a conveyance roller 14 and a platen 15 serving as the paper conveyance members that are in pair are arranged on the paper conveyance path 10, and a paper discharge roller 16 is arranged on the inlet of the paper discharge support 7. A pressing roller 17 contacted with the paper discharge roller 16 in pressure is rotatably supported at the free end side of the opening/closing cover 9. In addition, a carrier 20 is supported by a carrier shaft 18 that is parallel to the axis of the conveyance roller 14 and a guide rail 19 in such a manner that the carrier 20 is reciprocated linearly. An impact head 21 serving as the print head is carried on the carrier 20, and meanwhile an ink ribbon cassette 22 is detachably supported by the carrier 20.

In such a printer apparatus 1, in a case of using a cut paper 23 serving as the printing medium, the paper is fed from the manual feeding tray 4; while in a case of using a continuous-feed paper 24, the paper is fed from the paper feeding port 5. Regardless of what kind of printing medium is used, the printing medium is conveyed by the conveyance roller 14. In addition, in the process in which the carrier 20 is travelled along the carrier shaft 18 and the guide rail 19, the impact head 21 is driven to print on the printing medium. The printing medium subjected to the printing processing is discharged to the paper discharge support 7 through the paper discharge roller 16. Further, a photo sensor 25 and a plurality of position sensors 26 that is arranged opposite to the photo sensor 25 across the paper conveyance path 10 are arranged at the downstream side of the impact head 21.

When printing, whether the printing is carried out on the cut paper 23 or the continuous-feed paper 24 serving as the printing medium, the printing medium is arranged between the impact head 21 and the platen 15. Further, an ink ribbon that is impregnated with ink is arranged between the impact head 21 and the printing medium, and the ink that is impregnated in the ink ribbon is sequentially transferred to the medium during the printing process. Such an ink ribbon, which is formed in an endless shape, is stored in the ink ribbon cassette 22 and is circularly moved in the ink ribbon cassette 22.

Figure 2:
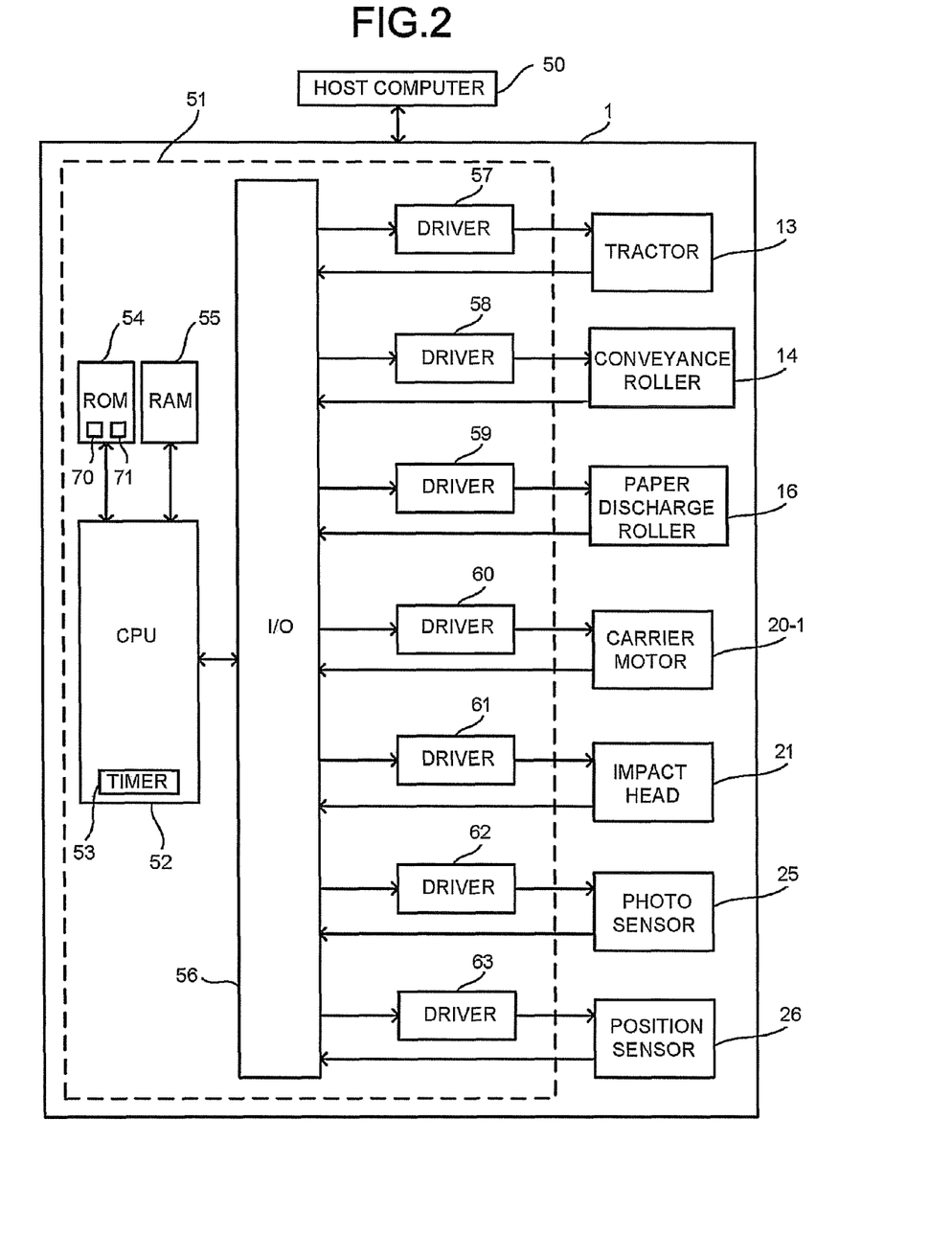
FIG. 2 is a block diagram illustrating the constitution of a control circuit of the printer apparatus according to the first embodiment.

FIG. 2 is a block diagram illustrating the constitution of a control circuit of the printer apparatus 1 according to the present embodiment. A control section 51 carries out various controls such as paper conveyance control, printing control, paper discharge control, printing image detection control and paper position detection control.

The control section 51 is constituted by, for example, a micro-computer which carries out connection with a host computer 50 and the execution of various controls. A central processing unit (CPU) 52 of the control section 51 carries out, according to programs, operations and various controls such as paper conveyance control, printing control, paper discharging control, printing image detection control and paper position detection control.

The CPU 52 further comprises a timer 53 serving as a module for carrying out time setting and time control.

A ROM 54 and a RAM 55 are arranged in the control section 51 as primary storage modules for storing control programs executed by the CPU 52 and data generated during a control process or an operation process.

The ROM 54 is a read-only memory in which control programs and tables and the like are stored, and the RAM 55 is a random access memory for storing the data generated during an operation process. Further, a later-described confirmation condition section 70 serving as conditions indicating whether to confirm the concentration at which timing and an exchange necessity determination table 71 with respect to the measured reflectance are arranged in the ROM 54.

An input/output unit (I/O) 56 is arranged in the control section 51 to acquire various input data from the host computer 50 and export a control output of the control section 51 to the host computer 50. The I/O 56 is connected with the CPU 52, the ROM 54 and the RAM 55 via a bus line.

The I/O 56 is connected with a first, a second, a third, a fourth, a fifth, a sixth, and a seventh drivers 57, 58, 59, 60, 61, 62, and 63 serving as modules for exporting a control output.

The first driver 57 supplies a required drive output for the tractor 13. The second driver 58 supplies a required drive output for the conveyance roller 14. The third driver 59 supplies a required drive output for the paper discharge roller 16. The fourth driver 60 supplies a required drive output for carrier motor 20-1. The fifth driver 61 supplies a drive output for the impact head 21. The sixth driver 62 supplies a required drive output for the photo sensor 25. The seventh driver 63 supplies a required drive output for the position sensors 26.

The CPU 52 of the control section 51 carries out the driving of rotation and stopping of the tractor 13 through the driver 57 to carry out the conveyance of the continuous-feed paper 24.

The CPU 52 of the control section 51 carries out the driving of rotation and stopping of the conveyance roller 14 through the driver 58 to carry out the conveyance of the cut paper 23 and the continuous-feed paper 24.

The CPU 52 of the control section 51 carries out the driving of rotation and stopping of the paper discharge roller 16 through the driver 59 to carry out the conveyance of the cut paper 23 and the continuous-feed paper 24.

The CPU 52 of the control section 51 carries out the driving of rotation and stopping of the carrier motor 20-1 through the driver 60 so that the impact head is moved in a direction orthogonal to the paper conveyance direction.

The CPU 52 of the control section 51 drives the impact head 21 through the driver 61.

The CPU 52 of the control section 51 detects the printing of the impact head 21 through the photo sensor 25 that is driven by the driver 62.

The CPU 52 of the control section 51 detects the position of the printing medium through the position sensor 26 that is driven by the driver 63.

Hereinafter, the operations of the printer apparatus 1 are described with reference to FIG. 1-FIG. 7. Although it is possible for the printer apparatus 1 to print on any of the cut paper 23 inserted from the manual feeding tray 4 and the continuous-feed paper 24 conveyed by the tractor 13, it is exemplified in the present embodiment that the printing is carried out on the cut paper 23.

When the printer apparatus 1 receives printing data from the host computer 50, the cut paper 23 is to be conveyed to the impact head 21 serving as a printing section by the conveyance roller 14. The control section 51 moves the impact head 21 in a direction orthogonal to the conveyance direction of the cut paper 23 through the carrier motor 20-1 (not shown), and meanwhile energizes a coil arranged on the impact head 21. The energized coil attracts an armature having dot pins, in this way, the dot pins protrude to the platen 15 side.

During the printing process, the cut paper 23 is positioned between the impact head 21 and the platen 15. Further, an ink ribbon that is drawn out from the ink ribbon cassette 22 and is impregnated with ink is arranged between the impact head 21 and the cut paper 23, and the ink impregnated in the ink ribbon that is positioned at the protruded dot pins is sequentially transferred to the cut paper 23, in this way, a printing is performed.

Figure 3:
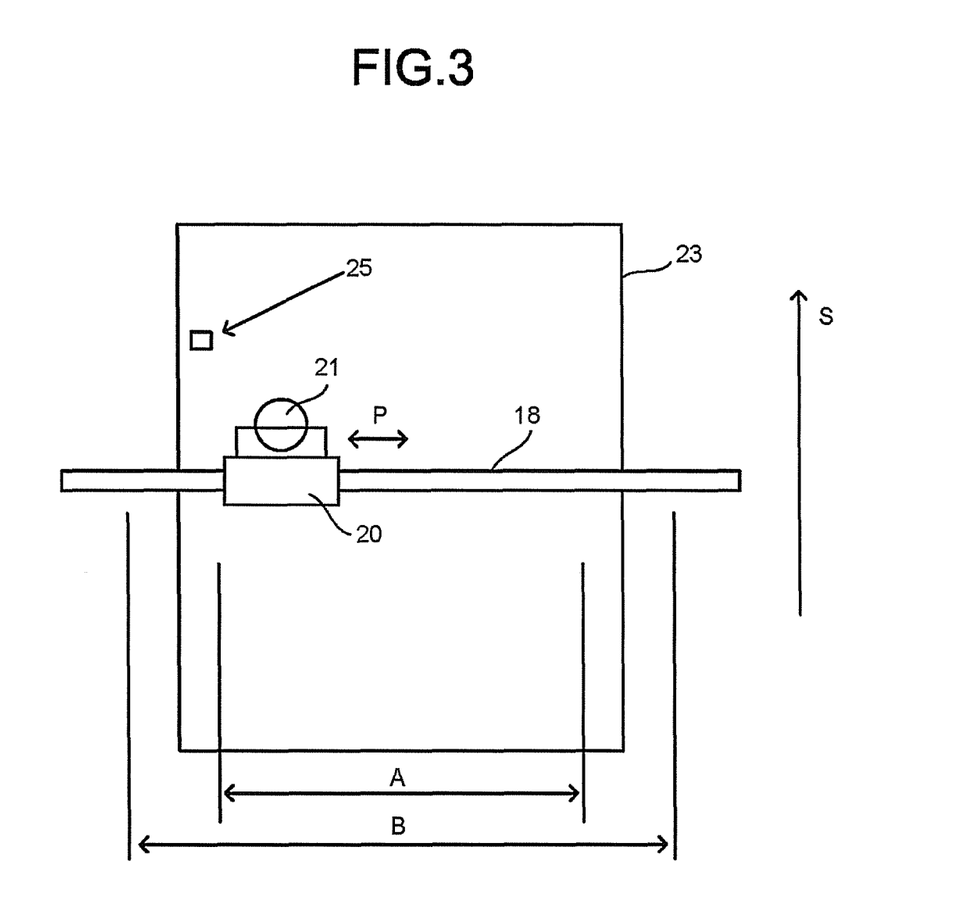
FIG. 3 is a plane diagram illustrating the position of a reflection-type sensor of the printer apparatus according to the first embodiment.

FIG. 3 is a top view illustrating the position relationship among the cut paper 23, the impact head 21 and the photo sensor 25 according to the present embodiment. Further, the cut paper 23 is conveyed in a S direction on the conveyance path of the printer apparatus 1.

The carrier 20 that carries the impact head 21 is held on the carrier shaft 18 and may be reciprocated in a P direction serving as a direction orthogonal to the conveyance direction of the cut paper 23. The movement width of the carrier is B and is set to be longer than the paper width of the cut paper 23. Further, a width of the printing area (A) is set to be shorter than the width of the cut paper 23. Further, the photo sensor 25 is arranged on a paper conveyance guide (not shown) at the downstream side of the impact head 21 between the end portion of A serving as the width of the printing area and the end portion of the cut paper 23, and the detection surface of the photo sensor 25 faces the printing surface side.

Figure 4:
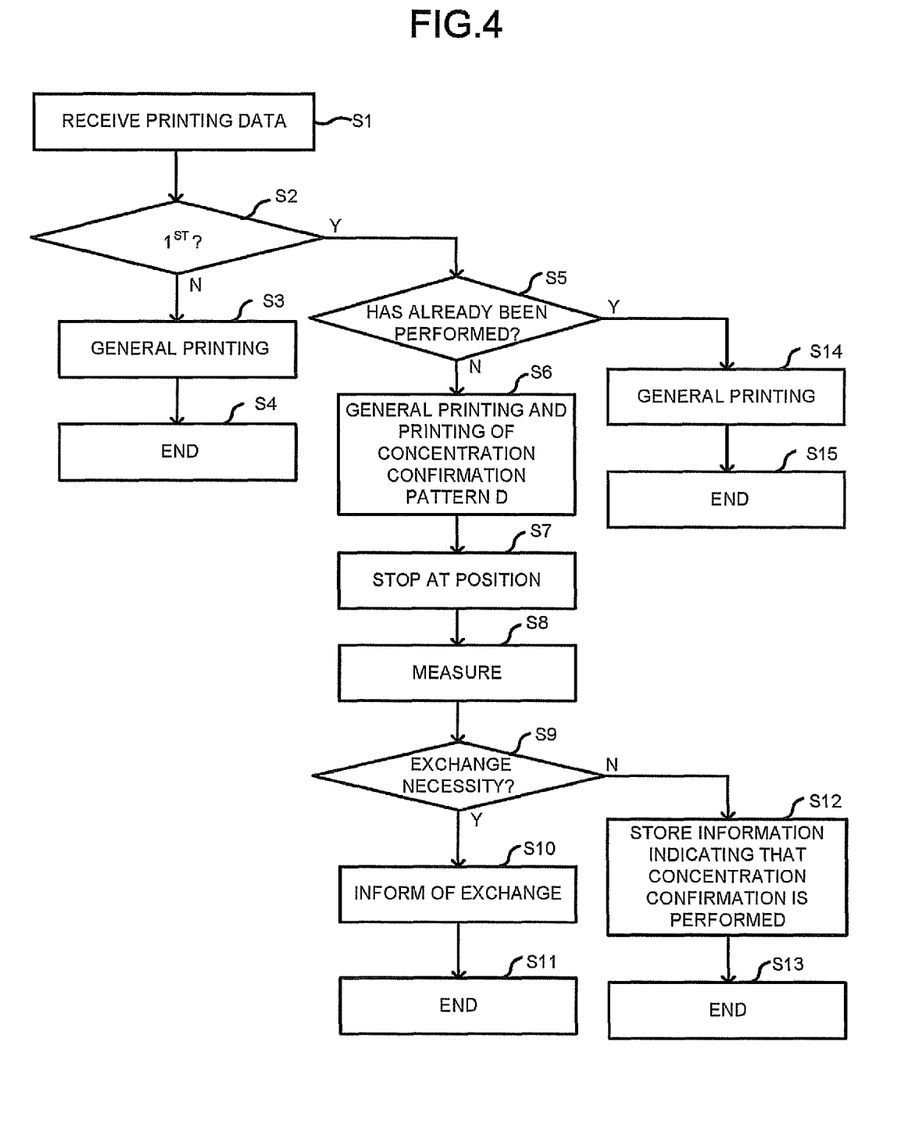
FIG. 4 is a flowchart illustrating an exchange necessity determination of an ink ribbon cassette according to the first embodiment.
Figure 5:
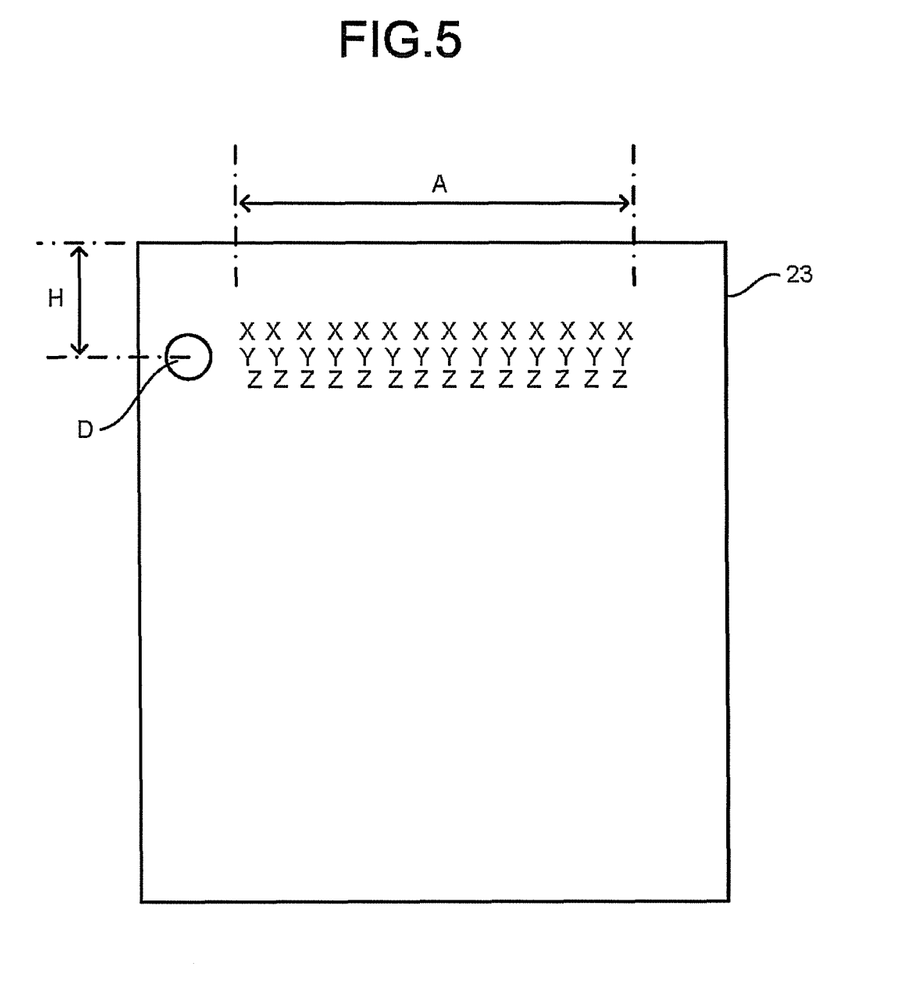
FIG. 5 is a diagram illustrating a position relationship between a general printing and a concentration confirmation printing pattern according to the first embodiment.

Next, the exchange determination of the ink ribbon is described with reference to FIG. 4 and FIG. 5. The confirmation condition section 70 is arranged in the ROM 54. The confirmation condition section 70 is used to store confirmation condition expressions indicating whether to confirm the concentration of the printer apparatus 1 at which timing. The confirmation condition expression which is, for example, to confirm the concentration when the printer apparatus 1 prints 1000 sheets of paper, to confirm the concentration at 10:00 AM every day, to confirm the concentration on the $1^{st}$ of each month and the like, may be set arbitrarily by the user of the printer apparatus 1. In the present embodiment, it is assumed that such a confirmation condition expression, that is, to confirm the concentration on the $1^{st}$ of each month, is stored.

When the printer apparatus 1 receives printing data from the host computer 50 (S1), it is confirmed whether or not today is $1^{st}$ (S2) according to the confirmation expression stored in the confirmation condition section 70. In a case where today is not $1^{st}$ (NO in S2), a general printing is carried out (S3) and then the printing is ended (S4) without carrying out the concentration confirmation.

On the other hand, in a case where today is $1^{st}$ (YES in S2), it is confirmed whether or not the concentration confirmation has already been performed today (S5). This is to prevent that the concentration confirmation is carried out several times on the same day.

Information indicating whether or not the concentration confirmation is performed is, for example, stored in the RAM 55. Further, the data that is not performed is stored as an initial value in the RAM 55.

In S5, in a case in which the concentration confirmation has not been performed yet (NO in S5), the printer apparatus 1 carries out a printing of a concentration confirmation pattern D on the cut paper 23, in addition to the general printing. Such a printing content is described with reference to FIG. 5 and FIG. 6.

Figure 6:
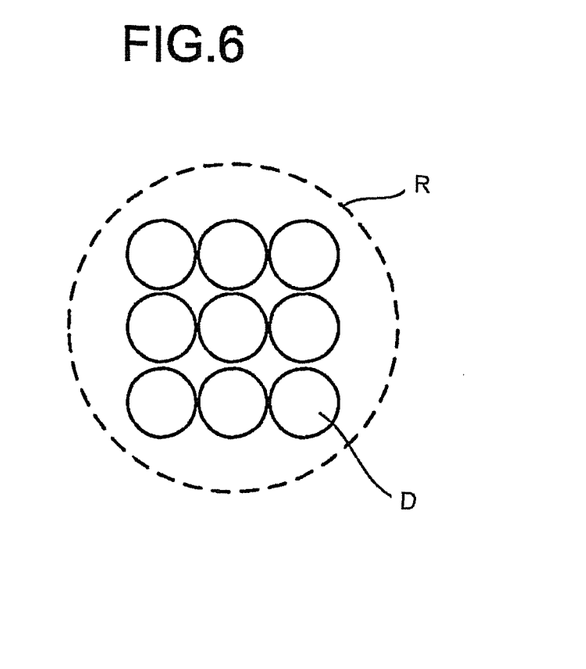
FIG. 6 is an example illustrating a concentration confirmation printing pattern according to the first embodiment.

When the printing apparatus 1 receives printing data from the host computer 50, a printing corresponding to the printing data received from the host computer 50 is carried out in an area within A serving as the width of the printing area. Further, the printer apparatus 1 prints the concentration confirmation pattern D at a position H distance away from the front end of the cut paper 23 and in an area outside A serving as the width of the printing area (S6). Further, such a concentration confirmation pattern D is constituted by total 9 dots consisting of 3 dots in the vertical direction and 3 dots in the horizontal direction as shown in FIG. 6.

When the printer apparatus 1 carries out the general printing and the printing of the concentration confirmation pattern D on the cut paper 23, the position sensor 26 masters the position of the cut paper 23. Then the conveyance of the cut paper 23 is stopped (S7) at a position where the concentration confirmation pattern D printed on the cut paper 23 is consistent with the detection area R of the photo sensor 25, and the reflectance is measured by the photo sensor 25 (S8). it is exemplified in the present embodiment that the conveyance of the cut paper 23 is stopped at a position where the concentration confirmation pattern D printed on the cut paper 23 is consistent with the detection area R of the photo sensor 25 in the process in which the general printing and the printing of the concentration confirmation pattern D are carried out on the cut paper 23. However, the present invention is not limited to this. The cut paper 23 may be switched back and conveyed after the general printing is ended, and then the concentration confirmation pattern D is printed on the cut paper 23.

Next, the control section 51 determines whether or not the ink ribbon cassette 22 should be exchanged according to the measured result of the reflectance and the exchange necessity determination table 71 (S9). In a case where the control section 51 determines that it is necessary to exchange the ink ribbon cassette 22 (YES in S9), a message indicating that the ink ribbon cassette 22 should be exchanged is informed through a display, a LED and the like (none is shown) (S10). Then, the control section 51 discharges the printed cut paper 23 from the paper discharge support 7 to the outside of the printer apparatus 1 and ends the printing (S11).

In S9, in a case where the control section 51 determines that it is not necessary to exchange the ink ribbon cassette 22 (NO in S9), "performed on ** (month) $1^{st}$" is stored in an area (not shown) where information indicating whether or not the concentration confirmation is performed is stored in the RAM 55 (S12), the printed cut paper 23 is discharged from the paper discharge support 7 to the outside of the printer apparatus 1, and then the printing is ended (S13).

In S5, in a case where the concentration confirmation has already been confirmed today (YES in S5), the printer apparatus 1 carries out only the general printing on the cut paper 23 (S14), discharges the printed cut paper 23 from the paper discharge support 7 to the outside of the printer apparatus 1, and then ends the printing (S15).

Further, in the present embodiment, the concentration confirmation pattern D is at least printed by the pins having high use frequency of the impact head.

Figure 7:
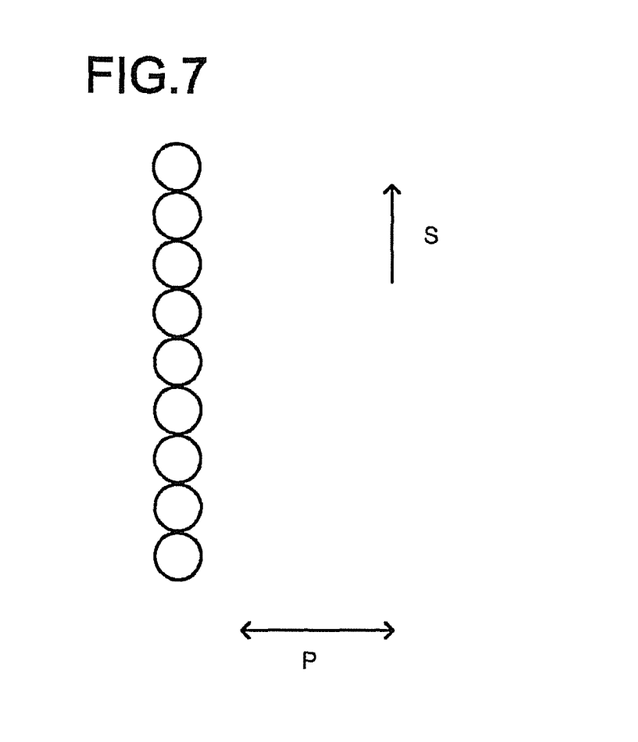
FIG. 7 is an illustration diagram illustrating a pin arrangement of an impact head according to the first embodiment.

As shown in FIG. 7, the dot pins of the impact head are arranged along the paper conveyance direction S. The dot pins serving as the impact head 21, which are carried on the carrier 20 and held by the carrier shaft 18, move in the P direction. Thus, the dot pins are contacted with the ink ribbon in the ink ribbon cassette 22 at positions where the height of the ink ribbon is the same as that of the dot pins.

FIG. 7 illustrates 9 pins as an example. In a case of carrying out printing using the impact head 22 having such 9 pins, the $4^{th}$ pin is used most often and the $9^{th}$ pin is used least often. Thus, after a large amount of printing is carried out, the ink impregnated in the ink ribbon at the position of the $4^{th}$ pin is transferred more than the ink impregnated in the ink ribbon at the position of the $9^{th}$ pin to the medium to be printed. Thus, in a case of printing the concentration confirmation pattern D, it is desired to carry out a printing using the pin having a high use frequency of the impact head that may print the pattern the thickness of which is thinner. Thus, in a case of printing the concentration confirmation pattern D, the printing process is carried out at least by the pins having high use frequency of the impact head.

In this way, the concentration confirmation pattern D is printed in addition to the general printing on a predetermined day, and whether or not the ink ribbon cassette should be exchanged is determined according to the reflectance of the concentration confirmation pattern D. As a result, it is possible for the user of the printer apparatus 1 to perform an exchange necessity determination of the ink ribbon cassette that is being used by observation without error. Further, the concentration confirmation pattern D is to be printed in an area outside A serving as the width of the printing area, which won't affect the quality of the general printing. In addition, the concentration confirmation pattern D is constituted by 9 dots, of which the width and the height is altogether about 1 mm, and thus it is very small. However, in a case of avoiding that there is printing unrelated with the general printing in the area outside A serving as the width of the printing area, the general printing and the printing of the concentration confirmation pattern D may be carried out on different the cut paper 23. Further, in a case of printing the concentration confirmation pattern D, since the printing is carried out by the pins having high use frequency of the impact head, it is possible to perform a correct determination on whether or not to exchange the ink ribbon cassette without carrying out the concentration determination according to the concentration confirmation pattern D printed with the part of the ink ribbon where the ink is more. Further, it is exemplified in the present embodiment that the impact head is constituted by 9 pins and the pin having high use frequency is the $4^{th}$ pin. However, the impact head to be used is not limited to the one having 9 pins, and may be an impact head having other number of pins, for example, 24 pins and the like. Further, in a case of using a head having 24 pins, the pin having the highest use frequency is the $10^{th}$ pin.

As stated above, in the present embodiment, the concentration confirmation pattern D is printed at a position outside the printing area, and the exchange necessity determination of the ink ribbon cassette is carried out according to the reflectance of the concentration confirmation pattern. In this way, the user of the printer apparatus 1 may determine the exchange determination on the ink ribbon cassette to be unnecessary by observation confirmation.

A Second Embodiment

Hereinafter, a second embodiment is described. In the second embodiment, the photo sensor 25 is arranged in an area within A serving as the width of the printing area, and meanwhile, a printing pattern analysis section is arranged.

As stated above, the printing of the concentration confirmation pattern D is carried out in the area outside A serving as the width of the printing area in the first embodiment. However, in a case of avoiding that there is printing unrelated with the general printing in the area outside A serving as the width of the printing area, the general printing and the printing of the concentration confirmation pattern D may be carried out on different business forms 23. In the second embodiment, the printer apparatus 1 receives printing data from the host computer 50 and analyzes the received printing data, and confirms whether or not there is a printing pattern of the concentration confirmation pattern D at a position where the photo sensor 25 passes. In a case where it is confirmed that there is a printing pattern of the concentration confirmation pattern D, a concentration determination is carried out through the printing.

Figure 8:
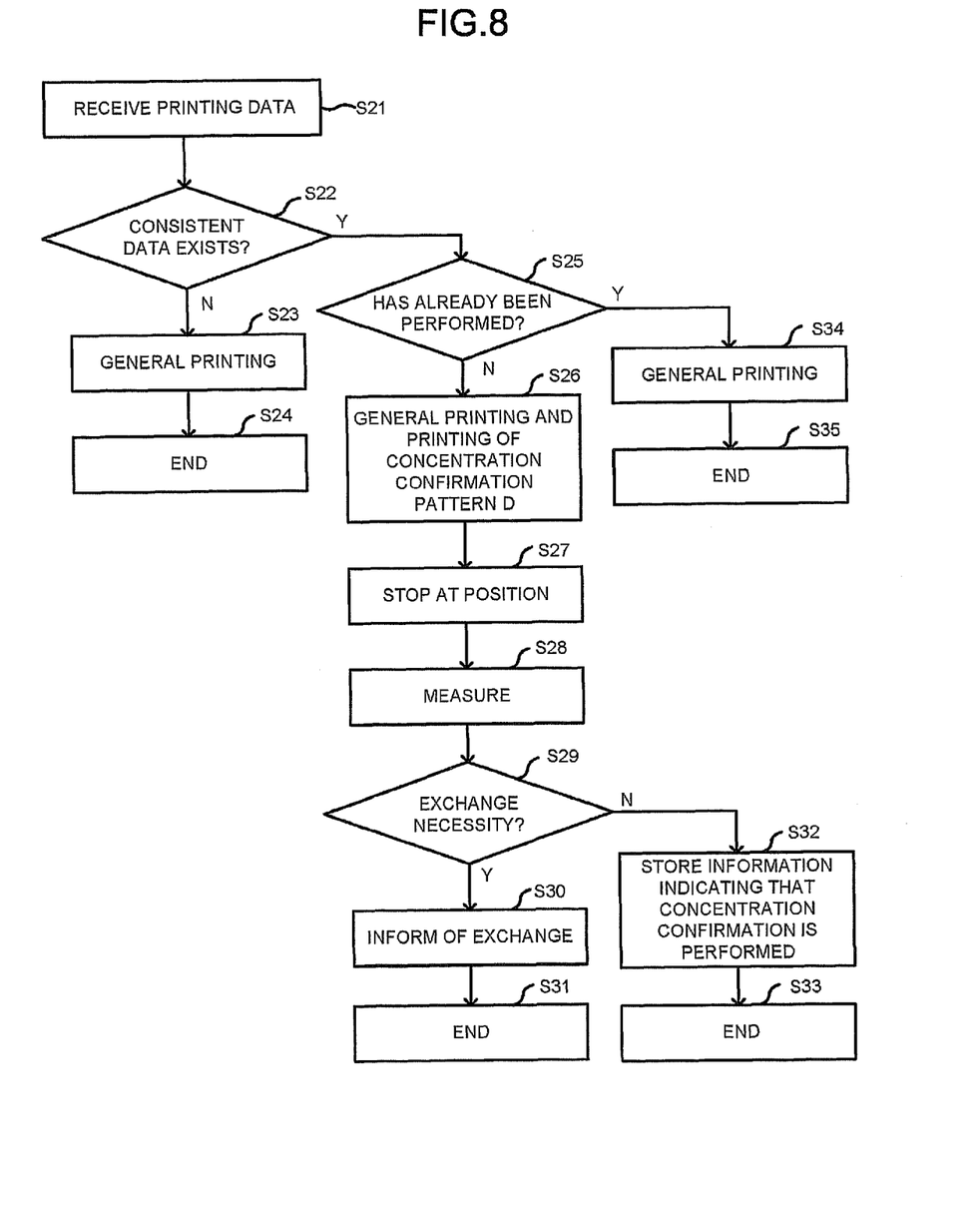
FIG. 8 is a flowchart illustrating an exchange necessity determination of the ink ribbon cassette according to a second embodiment.

Hereinafter, the second embodiment is described with reference to FIG. 8.

When the printer apparatus 1 receives printing data from the host computer 50 (S21), the printing pattern analysis section (not shown) arranged in the ROM 54 analyzes the received printing data, and confirms whether or not the preset concentration confirmation pattern D is to be printed in the extended line of the conveyance direction of the photo sensor 25 that is fixed in an area within A serving as the width of the printing area (S22). In a case in which the preset concentration confirmation pattern D is not printed (NO in S22), a general printing is carried out (S23) and then the printing is ended (S24) without carrying out the concentration confirmation.

In S22, in a case in which the preset concentration confirmation pattern D is to be printed (YES in S22), it is confirmed whether or not the concentration confirmation has already been performed today (S25). This is to prevent that the concentration confirmation is carried out several times on the same day.

In S25, in a case in which the concentration confirmation has not been performed yet (NO in S25), the printer apparatus 1 carries out a printing of a concentration confirmation pattern D on the cut paper 23, in addition to the general printing (S26).

The printer apparatus 1 receives printing data from the host computer 50, the printing pattern analysis section (not shown) arranged in the ROM 54 analyzes the received printing data, and when it is confirmed whether or not the preset concentration confirmation pattern D is to be printed in the extended line of the conveyance direction of the photo sensor 25 that is fixed in an area within A serving as the width of the printing area, it is confirmed whether or not the preset concentration confirmation pattern D is to be printed at which position of the printing. The conveyance of the cut paper 23 is stopped (S27), according to the position information, at a position where the concentration confirmation pattern D printed on the cut paper 23 is consistent with the detection area R of the photo sensor 25, and the reflectance is measured by the photo sensor 25 (S28).

Next, the control section 51 determines whether or not the ink ribbon cassette 22 should be exchanged according to the measured result of the reflectance and the exchange necessity determination table 71 (S29). In a case where the control section 51 determines that it is necessary to exchange the ink ribbon cassette 22 (YES in S29), a message indicating that the ink ribbon cassette 22 should be exchanged is informed through a display, a LED and the like (none is shown) (S30). Then, the control section 51 discharges the printed cut paper 23 from the paper discharge support 7 to the outside of the printer apparatus 1 and ends the printing (S31).

In S29, in a case where the control section 51 determines that it is not necessary to exchange the ink ribbon cassette 22 (NO in S29), "performed on  (month),  (day)" is stored in an area where information indicating whether or not the concentration confirmation is performed is stored in the RAM 55 (S32), the printed cut paper 23 is discharged from the paper discharge support 7 to the outside of the printer apparatus 1, and then the printing is ended (S33).

In S25, in a case where the concentration confirmation has already been confirmed today (YES in S25), the printer apparatus 1 carries out only the general printing on the cut paper 23 (S34), discharges the printed cut paper 23 from the paper discharge support 7 to the outside of the printer apparatus 1, and then ends the printing (S35).

Further, in the present embodiment, the concentration confirmation pattern D is also at least printed by the pins having high use frequency of the impact head.

As stated above, in the present embodiment, the received printing data is analyzed, and it is confirmed whether or not the preset concentration confirmation pattern D is to be printed in the extended line of the conveyance direction of the photo sensor 25. In a case where it is printed, the printing is used to perform the concentration confirmation to determine whether it is necessary to exchange the ink ribbon cassette. In this way, it is not necessary to separately print the concentration confirmation pattern D in an area outside the printing area. Further, whether or not it is necessary to exchange the ink ribbon cassette is determined according to the reflectance of the concentration confirmation pattern. As a result, the user of the printer apparatus 1 may determine the exchange determination on the ink ribbon cassette to be unnecessary by observation confirmation.

Further, it is exemplified in both the first embodiment and the second embodiment that the concentration confirmation pattern D has 1 type. However, the present invention is not limited to this, and it may be set that the concentration confirmation pattern D has a plurality of types. In addition, the result of the measured reflectance corresponding to the concentration confirmation pattern D and the exchange necessity determination table 71 are held, and thus the precision of the exchange necessity determination of the ink ribbon cassette may be further improved.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A printer apparatus, comprising:
a paper conveyance path configured to convey a paper;
a carrier configured to move in a direction orthogonal to a conveyance direction of the paper to be conveyed on the paper conveyance path;
a dot matrix print head configured to include head pins arranged in the carrier;
an ink ribbon cassette in which an ink ribbon is arranged;
a photo sensor configured to be arranged at the external side of the movement direction of the carrier in the printing area of paper and at the downstream side in the paper conveyance direction of the dot matrix print head;
a concentration detection pattern printing module configured to print a predetermined concentration detection pattern with the head pins; and
an exchange necessity determination section configured to determine an exchange necessity of the ink ribbon cassette according to the value that is obtained by detecting the printing created by the concentration detection pattern printing module through the photo sensor.

2. The printer apparatus according to claim 1, wherein
the concentration detection pattern printing module prints a predetermined concentration detection pattern with the head pin having a highest use frequency in the dot matrix print head.

3. The printer apparatus according to claim 1, wherein
the concentration detection pattern has a plurality of types.

* * * * *